Nov. 8, 1955
H. J. GISLER ET AL
2,723,032
VIBRATING SCREENS
Filed Dec. 18, 1950
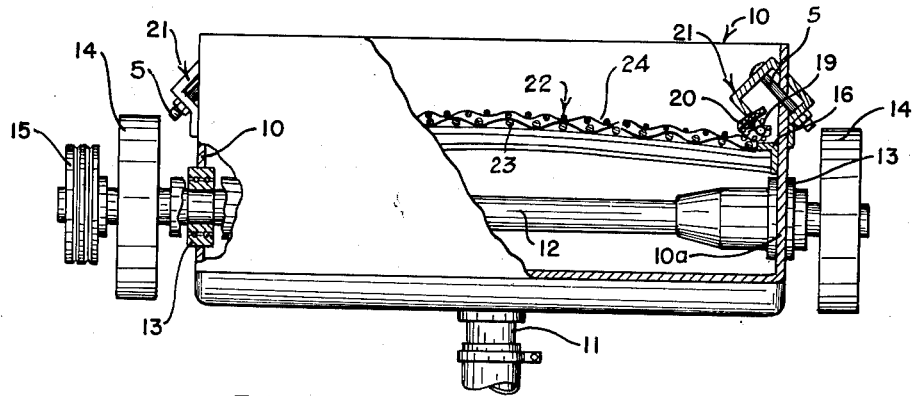
FIG.—1
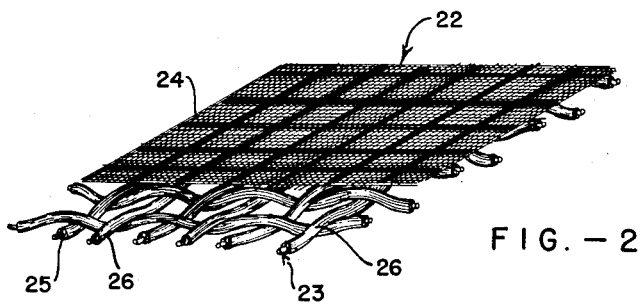
FIG.—2
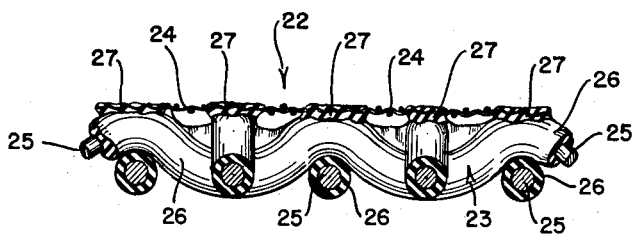
FIG.—3
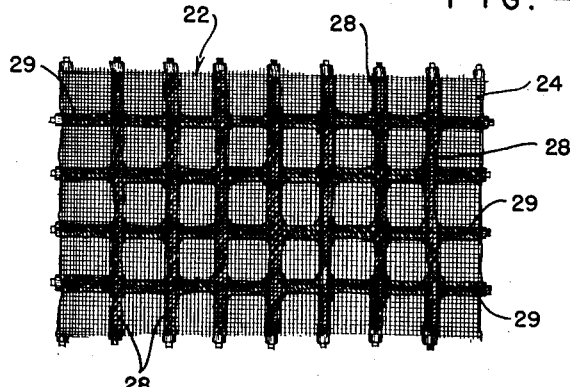
FIG.—4
INVENTORS.
James W. Jelks
BY & Henry J. Gisler
ATTORNEY

United States Patent Office 2,723,032
Patented Nov. 3, 1955

2,723,032

VIBRATING SCREENS

Henry J. Gisler, Denver, Colo., and James W. Jelks, Middletown, Ohio, assignors to Mining Process and Patent Company, Denver, Colo., a corporation of Delaware Application December 18, 1950, Serial No. 201,339

2 Claims. (Cl. 209—401)

The present invention relates to vibrating screens. It has to do particularly, although not exclusively, with improvements upon the presently well known Dillon type of vibrating screen for use in paper pulp treatment, or the like and to new methods of producing the same.

Various attempts have been made to produce efficient and durable oscillatory screens for fine mesh separation in wet or dry operations, but all, or nearly all such have failed, due largely to the fact that the differential vibrations to which the screens were subjected in use, caused tearing of the fine mesh wire screen or cloth. In accordance with previously known methods, it was the accepted practice to simply stretch fine mesh wire screen or cloth over a coarse mesh wire screen and then clamp the two together. The vibrations to which the laminated structures were subjected in use rendered such built-up filter screens unfit for use after reasonably short periods of time, because of the tearing of the finer mesh screen.

Many types of screens have been employed with so-called separator machines or classifiers for both wet and dry separation but these screens have proved to be unsatisfactory, particularly when a fine mesh wire screen was required, because of the fact that the fine mesh wire or cloth was simply laid over the coarser screen, with the two clamped together and the vibrations of the machine caused the fine mesh screen to tear or disintegrate, thus permitting coarser particles to pass through the screen mesh than was desirable.

It is therefore, one of the important objects of the present invention to provide an improved, efficient and durable oscillatory wire screen unit capable of use in various kinds of wet or dry operations, in which a fine mesh separation is desired.

Another object of the invention is to provide an improved oscillatory wire mesh screen of the foregoing character which is unaffected by differential vibrations set up by the separating or classifying machine of which it forms a part.

A further object of the invention is to provide an improved oscillatory wire screen in which a fine mesh wire screen is bonded to a coarse mesh wire screen to produce an integral unitary structure, without causing any appreciable size reduction in the screen interstices as the result of the bonding action.

The foregoing and other objects and advantages of the present invention will appear from the following description and appended claims when considered in connection with the accompanying drawing forming a part of this specification wherein like reference characters designate similar parts in the several views.

In said drawing:

Fig. 1 is an end elevational view, partly in section, and partly broken away, showing one application of the improved composite screen structure or unit of the present invention to a separating or classifying machine.

Fig. 2 is a fragmentary perspective view of the improved screen unit of the present invention, illustrating the fine wire mesh covering screen bonded to the coarser mesh backing screen, with a portion of the former screen removed for purposes of clarity.

Fig. 3 is an enlarged detail vertical sectional view, taken through a portion of the composite screen of Fig. 2; and Fig. 4 is a top plan view of the improved composite or laminated vibrating screen of the preceding views.

Before explaining in detail the present invention it is to be understood that the invention is not limited in its application to the details of construction and arrangement of parts illustrated in the accompanying drawing, since the invention is capable of other embodiments and of being practiced or carried out in various ways.

Referring now to the drawing, and particularly to Fig. 1 thereof, there is shown therein a conventional separator having installed therein an oscillating screen according to the invention. In this view, 9 designates the screen unit as a whole and it consists, as shown, of a frame or support 16, preferably formed from angle iron or the like, on which is mounted a composite oscillatory screen designated as a whole by numeral 22. In the common practice of applying a finer wire mesh screen to a coarser mesh backing screen, a fine wire mesh screen is merely stretched across a coarse backing screen and is wrapped or folded around a longitudinal wire or rod 19 to provide a folded-over portion 20. The side walls 10a of the machine carry a series of spaced clamping members or devices, each of which is shown as a whole at 21. These devices are tightened down in conventional manner, as by means of bolts 5, so as to hold tightly the composite screen 22 on the support 16. The mere stretching and holding of a fine mesh screen on a coarse mesh screen is unsatisfactory for the reason that the vibrations which are set up by the machine during its operation, cause the fine wire mesh to tear or fracture to such an extent as to nullify the screening process. In other words, the differential vibrations which occur during the operation of the apparatus, cause the two loose wire screen members or cloth to separate and tear, thus allowing over-size particles to pass through the screen.

Since the machine or apparatus illustrated fragmentarily in Fig. 1 is of the vibratory type, the shaft or shafts 12 are eccentrically mounted in the side walls 10a of the machine and when power is applied to the V-belt pulley 15, the vibrating action is created. It is this vibrating action that causes damage to the previously known types of overlaid screen in which a very fine wire screen is stretched over a coarser backing wire mesh screen.

Various types of screens have been employed with the so-called separator or classifier machines for both wet and dry separation but these screens have proved to be unsatisfactory, particularly when a fine mesh screen was required, because of the fact that the fine mesh wire was simply laid over the coarser wire screen and the vibrations set up by the machine caused the fine mesh screen wire to tear, thus permitting the larger particles to pass through the screen mesh than was desirable. Actually, differential vibrations to which the two different types of screen wire were subjected, caused the damage.

In accordance with the present invention an entirely different composite screen unit is provided. One form of such unit is illustrated in detail in Figs. 2, 3 and 4. It will be noted that the unit, designated as a whole by numeral 22, comprises a section of wire screen mesh of relatively coarse type, shown as a whole at 23. This coarse mesh wire screen, or cloth provides the backing screen or cloth of the unit. A fine mesh wire screen 24 is superimposed or mounted upon the backing screen 23.

Our improved composite screen structure 22 is capable of use with vibratory types of machines or apparatus, such as the one fragmentarily illustrated in Fig. 1. The new and improved screen unit 22 is not subject to the defect of tearing or mutilation because of vibrations which are set up during the operation of the machine.

The screen unit 22 when fabricated, may be set into a rectangular frame, such as the angle frame 16 shown in Fig. 1, or in use, it may be mounted upon and securely attached to such a frame. The screen unit 22 has its coarse backing wire mesh or cloth coated or covered preferably with rubber or some suitable rubber or synthetic rubber composition. The strands are indicated at 25 and the covering or coating at 26. Since all of the strands 23 are coated or covered, there is, of course, rubber-to-rubber contact between these strands of the coarser mesh screen 23.

The coarse or backing wire screen or cloth 23 is preferably treated by subjecting it to a coating of some suitable cement, such as "EFG" cement, which is then allowed to dry, either in the atmosphere or by exposure to heat. After drying, the cement-coated wire mesh screen 23 is subjected, as by means of dipping, or in any other suitable manner, to a treatment which gives it a coating of rubber, or synthetic rubber, or a compound of such. "Lotol" is particularly useful for this purpose. The thus treated wire is then dried for a predetermined period of time which, of course, will vary in accordance with the thickness of the coating and the type of coating employed. Thereafter, a coating of the said suitable cement is applied, preferably by brushing, to the top or contact side of the backing screen 23. The relatively fine wire mesh screen or cloth 24 is now laid upon the previously-coated coarse backing screen or cloth 23 and pressure is applied, while at the same time the composite screen structure is being subjected to heat treatment. This heat treatment and pressure-applying continues for a sufficient period of time to effect the proper cure of the rubber or rubber compound or other coating and the cement and to firmly bond the fine mesh wire screen 24 to the relatively coarse mesh wire screen 23 to provide a unitary screen structure, as shown. The result of this bonding together of the finer and coarser mesh screens is best illustrated in the fragmentary and somewhat enlarged detail view of Fig. 3. It will be noted in this figure that the fine mesh wire screen 24 is bonded to the coarse mesh previously coated backing screen 23 at the several points indicated, for example, at 27 in this figure. Actually, the fine mesh wire screen is bonded to the coarse mesh backing screen at all of their points of contact so that, in effect, a checkerboard appearance occurs, as may be clearly seen in Fig. 4 of the drawing. As shown in Fig. 4, the permanent bonding together of the two different size mesh wire screens occurs in substantially parallel lines which extend transversely and longitudinally of the unit 22, as will be seen in Fig. 4. These transverse lines are indicated at 28, whereas the longitudinal lines are shown at 29.

If desirable, the surrounding or marginal edges of the fine wire mesh screen may be similarly bonded to the surrounding or marginal edges of the coarser backing screen by subjecting the screens to treatment such as described above in connection with the bonding together along the crossed lines 28 and 29. Such bonding together at the marginal edges is, of course, accomplished also by the application of heat while the two screen portions or cloth are being held under pressure.

The backing screen or cloth 23 may be of the rolled flat-top type and of any coarse size such, for example, as three (3) or four (4) mesh. The mesh of the finer wire screen 24 varies, of course, in accordance with the mesh the separating job to be done. For example, the mesh of the fine wire screen or cloth 24 may vary from the order of minus 20 (−20) to the order of minus 325 (−325).

Various kinds of cement may be used to coat the strands of the coarser wire mesh screen 23. In accordance with one method or mode of procedure embodying the present invention, the coarse wire mesh screen or cloth after cleaning, as by sand blasting may be dipped into a cement for a thin coat, dried, and then dipped into or otherwise coated by a product which is known commercially as "Lotol." "Lotol" may be described as a latex emulsion in water. After the second dipping or coating operation, the coated coarse wire screen 23 is dried. To complete the process or method, a coating of cement is preferably applied by a brush to the top or contact surface of the coarser wire mesh 23, namely that surface which will contact with the fine wire mesh screen 24. After the brush-applied coating of cement to the coarse screen 23, the fine mesh wire or cloth 24 is laid upon the thus coated coarse wire mesh 23, the parts being pressed together firmly and held in such condition while being cured for a period of approximately thirty (30) minutes and at a temperature of approximately 220° F. If desired, a coarse mesh screen may be dipped a second time in "Lotol" and dried a second time before receiving the brush-coat of "EFG" cement. Thus, the last coat of cement and of "Lotol" are cured at the time of the bonding together of the two screen members.

While a specific rubber compound has been mentioned above, namely "Lotol," it will be understood that various kinds of cement and various kinds of rubber, natural or synthetic, and/or rubber-like compositions may be employed for this purpose. The main purpose is, of course, to provide a permanent bond between the contacting portions of the fine mesh wire screen 24 and the coarser mesh wire backing screen 23.

It is to be noted particularly that as a result of the process or method of the present invention, a considerable quantity of the wire-adhering cement or other material is accumulated and present at the points 27, see particularly Fig. 3. By virtue of the fact that the additional coating of cement is brush-applied at the points indicated in Figs. 3 and 4, it is a relatively simple matter to cause the upper or finer wire mesh screen 24 to firmly and permanently adhere or be bonded to the coarser backing screen 23. Therefore, no amount of vibration which might be set up during the operation of the machine upon which the screen unit is installed, will cause any separation of the two wire cloths. Moreover, the vibrations will not cause the finer mesh wire screen or cloth 24 to tear.

From the foregoing it will be seen that we have provided an improved composite wire screen unit for use particularly in connection with vibratory machines for separating or classifying solids from liquids.

As the result of the present invention there has been produced, for the first time, a composite type of screen adapted for use in a vibratory separator of a classifying machine, in which any desired size of fine mesh wire screen or cloth may be used in conjunction with a conventional coarse mesh wire screen or cloth, or foraminous metal backing to perform the desired separating function, and in which the fine mesh wire screen or cloth remains as an integral part of the unit at all times and throughout extended periods of use, without any danger or possibility of the finer mesh wire screen or cloth tearing, or separating from the coarser mesh backing screen or cloth.

While the composite vibrating unit of the present invention has been described above and shown in the drawing as consisting of a backing member which is usually formed from coarse wire mesh, such as is indicated as a whole at 23 in Fig. 3 of the drawing, it is to be understood that instead of employing the coarse wire mesh backing member, a perforated plate or other suitable reinforcement, such as a wedge-bar or wedge-wire screen construction may be employed for the backing member. In other words, the backing member or portion 23 of the filtering unit of the present invention may be in the form of a perforated or foraminous metal sheet, plate, or member. When such a member is used, the fine mesh wire screen, such as that shown as a whole at 22 in Fig. 3 of the drawing, will be applied to the backing member in the same manner as described fully above. The present invention is not intended to be limited to a filtering unit in which the backing member or portion thereof is formed from coarse mesh wire.

We claim:

1. A composite vibrating screen for classifying purposes, comprising a relatively coarse mesh wire backing screen, a resilient coating of substantial thickness covering the wires of said coarse screen, and a fine mesh screen covering substantially the entire area of said coarse mesh backing screen, said fine mesh screen being enclosed in said resilient coating at the points of contact therebetween and permanently bonded within said coating whereby the two screens are spaced apart and are resiliently bonded together.

2. A composite vibrating screen for classifying purposes, comprising a relatively coarse mesh wire backing screen, a resilient rubber material coating of substantial thickness covering the wires of said coarse screen, and a fine mesh screen covering substantially the entire area of said coarse mesh backing screen, said fine mesh screen being enclosed in said resilient rubber material coating along transverse and longitudinal parallel lines of contact between the two screens substantially corresponding to the wires of said coarse mesh screen and said fine mesh screen being embedded and permanently bonded within said resilient rubber material coating whereby the two screens are spaced apart by the coating material therebetween and are resiliently bonded together.

References Cited in the file of this patent

UNITED STATES PATENTS

| Number | Name | Date |
|---|---|---|
| 659,416 | Perry | Oct. 9, 1900 |
| 1,718,385 | Sherwood | June 25, 1929 |
| 1,849,471 | Arnold | Mar. 15, 1932 |
| 1,947,307 | Rafton | Feb. 13, 1934 |
| 2,015,087 | Rafton | Sept. 24, 1935 |
| 2,061,850 | Roberts | Nov. 24, 1936 |
| 2,069,362 | Ford | Feb. 2, 1937 |
| 2,082,513 | Roberts | June 1, 1937 |
| 2,273,148 | Schwarz et al. | Feb. 17, 1942 |
| 2,274,700 | Jenks | Feb. 14, 1942 |
| 2,283,877 | Heller | May 19, 1942 |
| 2,293,928 | Beal | Aug. 25, 1942 |
| 2,315,055 | Heller | Mar. 30, 1943 |
| 2,443,613 | Fuller | June 22, 1948 |